(12) United States Patent
Yasui (10) Patent No.: US 10,576,922 B2
(45) Date of Patent: Mar. 3, 2020

(54) VEHICLE FRONT PORTION STRUCTURE (71) Applicant: Toyota Jidosha Kabushiki Kaisha, Toyota-shi, Aichi-ken (JP)

(72) Inventor: Yohsuke Yasui, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 16 days.

(21) Appl. No.: 15/863,217

(22) Filed: Jan. 5, 2018

(65) Prior Publication Data
US 2018/0229679 A1 Aug. 16, 2018

(30) Foreign Application Priority Data
Feb. 15, 2017 (JP) .................. 2017-025600

(51) Int. Cl.
*B60R 19/48* (2006.01)
*B60R 19/52* (2006.01)
*B60K 11/08* (2006.01)
*B60K 11/00* (2006.01)

(52) U.S. Cl.
CPC .............. *B60R 19/52* (2013.01); *B60K 11/00* (2013.01); *B60K 11/085* (2013.01); *B60R 19/483* (2013.01); *B60R 2019/525* (2013.01); *B60Y 2400/3017* (2013.01)

(58) Field of Classification Search
CPC ........... B60Y 2400/3017; B60R 19/52; B60R 19/525; B60R 19/483; B60K 11/00; B60K 11/08; B60K 11/085
See application file for complete search history.

(56) References Cited

U.S. PATENT DOCUMENTS

| | | | |
|---|---|---|---|
| 9,616,743 B1* | 4/2017 | Mays .................... | B60K 11/085 |
| 2010/0176617 A1* | 7/2010 | Khazaal ................... | B60D 1/56 |
| | | | 296/1.08 |
| 2014/0039765 A1* | 2/2014 | Charnesky ............... | F01P 7/10 |
| | | | 701/49 |
| 2014/0155930 A1* | 6/2014 | Bennett ..................... | A61F 2/01 |
| | | | 606/200 |
| 2014/0335778 A1* | 11/2014 | Takanaga .................. | F24F 7/00 |
| | | | 454/333 |
| 2017/0144710 A1* | 5/2017 | Frayer ................... | B62D 25/082 |

(Continued)

FOREIGN PATENT DOCUMENTS

DE 102016008064 A1 12/2016
JP S57135984 U 8/1982
(Continued)

OTHER PUBLICATIONS

Japanese Office Action dated Nov. 5, 2019 in Japanese Patent Appln. No. 2017-025600.

*Primary Examiner* — Gregory A Blankenship
(74) *Attorney, Agent, or Firm* — Dinsmore & Shohl LLP (57) ABSTRACT

A vehicle front portion structure that includes: a radiator grille; a radar disposed at the radiator grille and a cover. The radar includes: an emission surface from which electromagnetic waves are emitted to the front of the vehicle, and an incidence surface at which reflected waves of the electromagnetic waves emitted to the front of the vehicle from the emission surface are incident. The cover is provided at the radiator grille to be openable and closable and the cover covers the emission surface and the incidence surface.

13 Claims, 9 Drawing Sheets

(56) References Cited

U.S. PATENT DOCUMENTS

| | | | | |
|---|---|---|---|---|
| 2017/0168137 A1* | 6/2017 | Cho | .................... | G01S 13/931 |
| 2017/0203649 A1* | 7/2017 | Jakobs | ................ | B60K 11/085 |
| 2017/0291485 A1* | 10/2017 | Yasui | .................... | B60K 11/04 |
| 2018/0015819 A1* | 1/2018 | Froling | ................ | B60K 11/04 |
| 2018/0056910 A1* | 3/2018 | Hong | ................ | B32B 15/04 |
| 2018/0126841 A1* | 5/2018 | Vacca | ................ | B60K 11/085 |
| 2018/0154763 A1* | 6/2018 | Dudar | ................ | B60H 1/00657 |
| 2018/0208050 A1* | 7/2018 | Sinn | .................... | B60K 11/085 |
| 2018/0229679 A1* | 8/2018 | Yasui | ...................... | B60R 19/52 |
| 2018/0291496 A1* | 10/2018 | Kim | ...................... | B60R 19/52 |
| 2018/0334132 A1* | 11/2018 | Hammer | ................ | B60R 21/34 |
| 2019/0026961 A1* | 1/2019 | Dudar | ................ | B60K 11/085 |
| 2019/0061513 A1* | 2/2019 | Tanaka | .................. | B60K 11/08 |

FOREIGN PATENT DOCUMENTS

| | | |
|---|---|---|
| JP | H0314479 U | 2/1991 |
| JP | 2004-138572 A | 5/2004 |

\* cited by examiner

FIG.9

VEHICLE FRONT PORTION STRUCTURE

CROSS-REFERENCE TO RELATED APPLICATIONS

This application is based on and claims priority under 35 USC 119 from Japanese Patent Application No. 2017-025600 filed on Feb. 15, 2017, which is incorporated by reference herein.

BACKGROUND

Technical Field

The present disclosure relates to a vehicle front portion structure.

Related Art

Japanese Patent Application Laid-Open (JP-A) No. 2004-138572 discloses a structure in which a radio wave radar provided at a front grille is covered with a cover.

When a radar is covered with a cover, electromagnetic waves emitted from the radar, such as infrared light, radio waves or the like, and reflected waves incident on the radar may be attenuated by the cover itself and by deposits adhering to the cover (for example, water droplets, dust and the like). Thus, a detection accuracy of the radar may deteriorate.

On the other hand, if a radar is not covered with a cover but left exposed, flying stones may come into contact with and damage an emission surface, an incidence surface and the like of the radar. Moreover, when the radar is not covered with a cover but left exposed, deposits (for example, water droplets, dust and the like) may adhere to the emission surface, incidence surface and the like of the radar. When deposits adhere to the emission surface, incidence surface and the like of the radar, the detection accuracy of the radar may deteriorate.

SUMMARY

A vehicle front portion structure according to an aspect includes: a radiator grille; a radar disposed at the radiator grille, the radar including an emission surface from which electromagnetic waves are emitted to the front of the vehicle and an incidence surface at which reflected waves of the electromagnetic waves emitted to the front of the vehicle from the emission surface are incident; and a cover provided at the radiator grille be openable and closable, the cover covering the emission surface and the incidence surface.

DESCRIPTION OF EMBODIMENTS

Herebelow, examples of embodiments relating to the present disclosure are described in accordance with the drawings. An arrow FR, an arrow UP and an arrow OUT that are shown where appropriate in the drawings indicate, respectively, a vehicle front side, a vehicle upper side and a vehicle width direction outer side. In the descriptions below, the front-and-rear direction of the vehicle and the vehicle vertical direction may simply be referred to as, respectively, front and rear and up and down.

First Exemplary Embodiment

—Vehicle Front Portion Structure 10—

First, structures of a vehicle front portion structure 10 according to the first exemplary embodiment are described.

Figure 1:
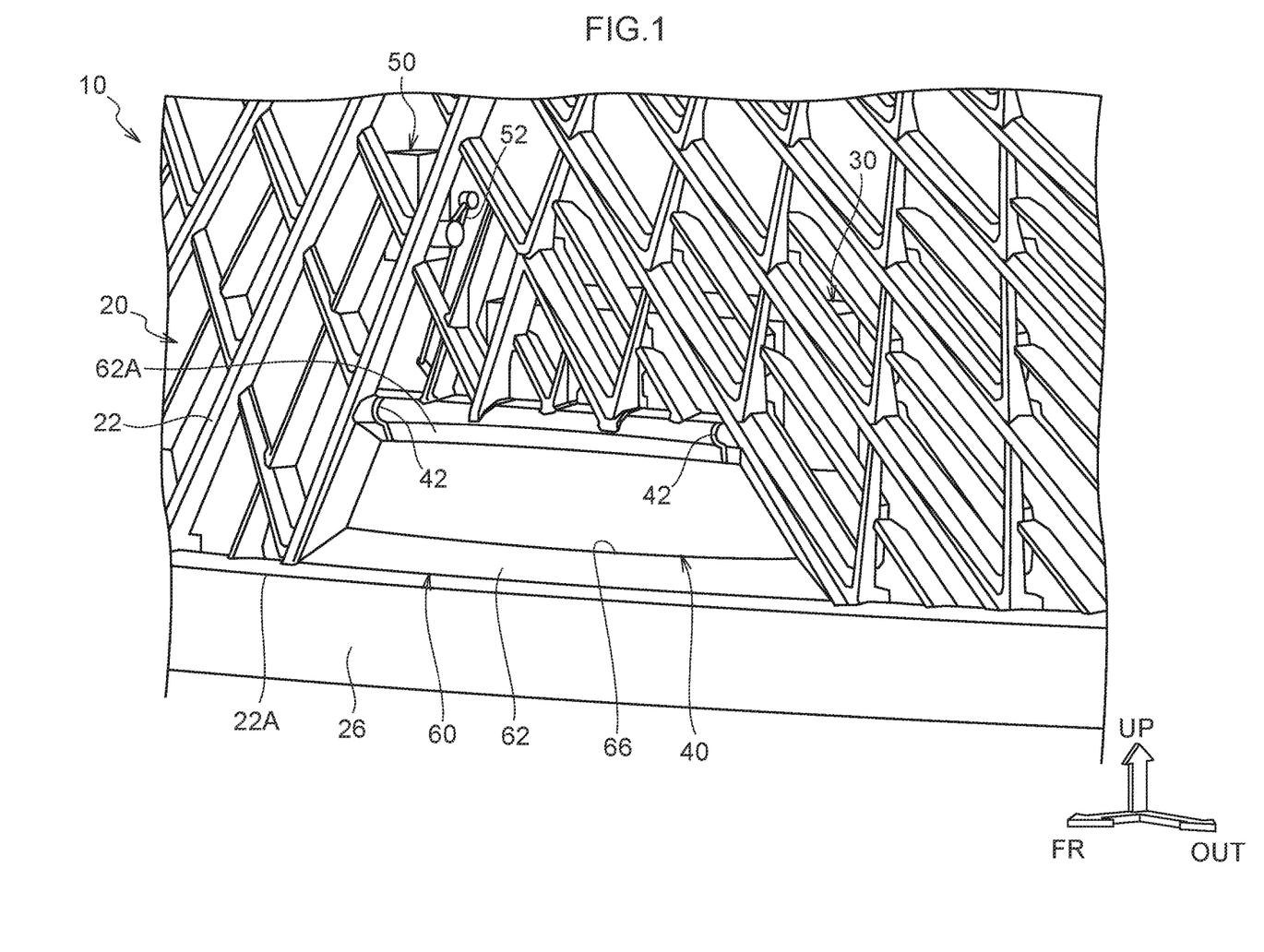
FIG. 1 is a perspective view showing a vehicle front portion structure according to a first exemplary embodiment.
Figure 2:
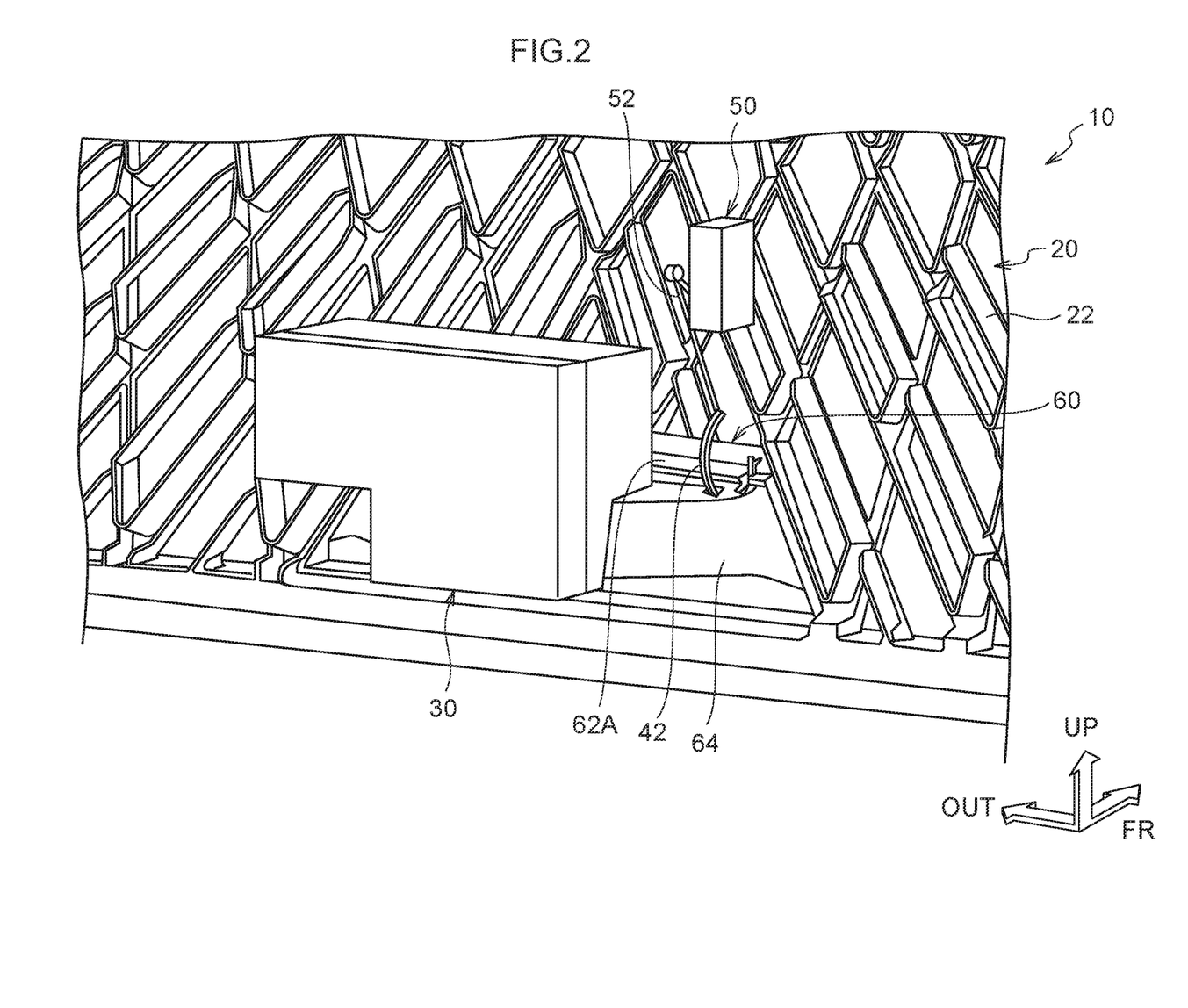
FIG. 2 is a perspective view showing the vehicle front portion structure shown in FIG. 1 from the vehicle rear side.
Figure 5:
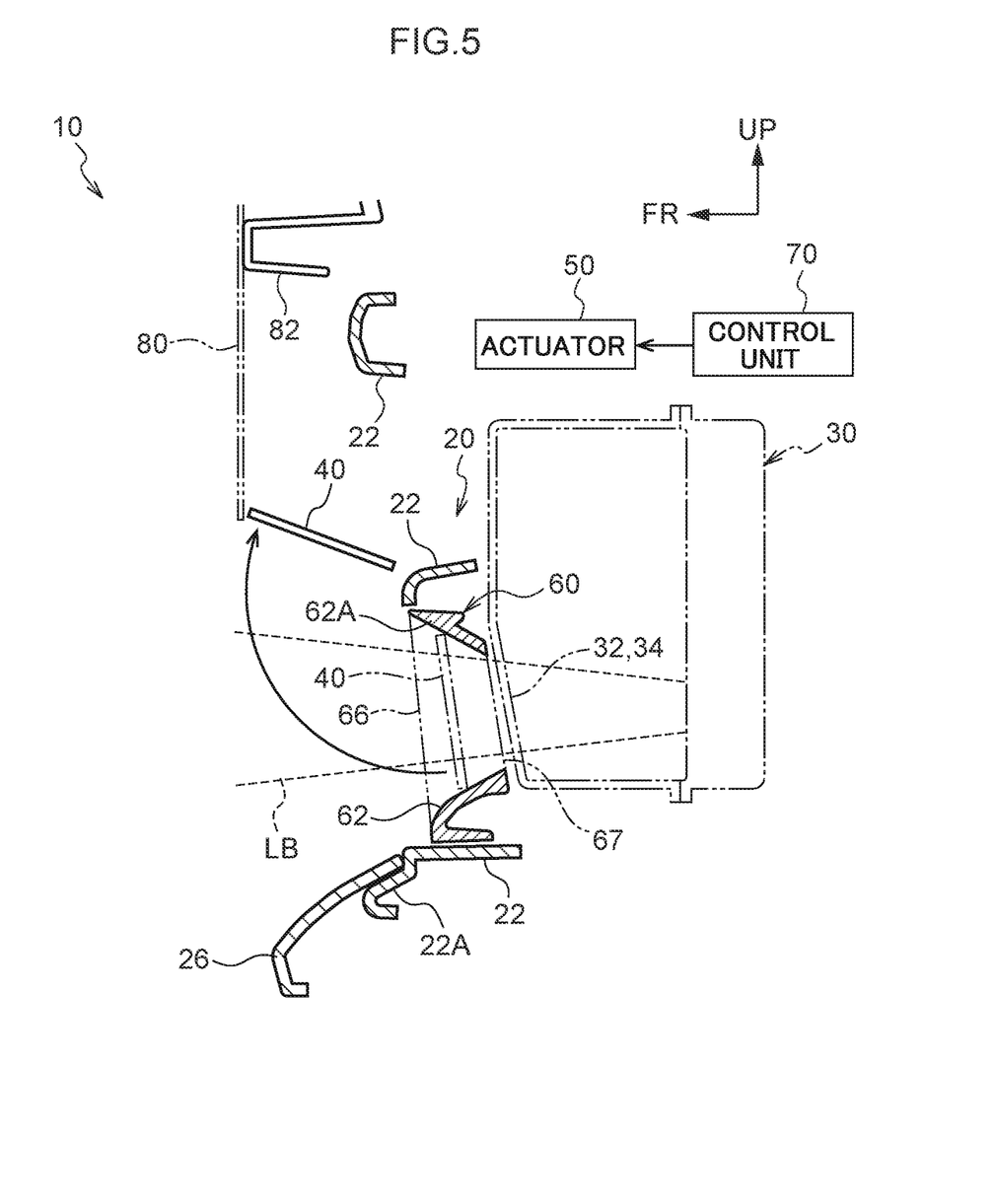
FIG. 5 is a side sectional view showing a portion of the vehicle front portion structure shown in FIG. 1.

As shown in FIG. 1, FIG. 2 and FIG. 5, the vehicle front portion structure 10 is provided with a radiator grille 20, a radar 30, a cover 40, and an actuator 50 that serves as an example of a driving mechanism.

As shown in FIG. 1, the radiator grille 20 includes a grille portion 22, a bezel portion 60 and a metal-plated molding 26. The grille portion 22 is formed in a mesh shape. The grille portion 22 has the function of taking in running wind during running of the vehicle, in order to cool a radiator and the like disposed at the vehicle rear side relative to the grille portion 22.

The metal-plated molding 26 is provided along the vehicle width direction at a lower end portion 22A of the grille portion 22. The metal-plated molding 26 is a molding member molded of resin, the surface of which is metal-plated for decoration. The metal plating that is used is, for example, chrome plating.

The bezel portion 60 is disposed at a vehicle width direction central portion of the grille portion 22 and the metal-plated molding 26, at a lower portion of the grille portion 22 at the upper side of the metal-plated molding 26. The bezel portion 60 is an arrangement portion at which the cover 40 is disposed. To be more specific, the bezel portion 60 includes a frame portion 62 and a spacer portion 64 (see FIG. 2 and FIG. 3). As shown in FIG. 1, the frame portion 62 is formed in a frame shape that is a trapezoid shape in front view. An aperture portion 66 is formed by being encircled by the frame portion 62. The aperture portion 66 is opened and closed by the cover 40 and is formed in a trapezoid shape.

Figure 3:
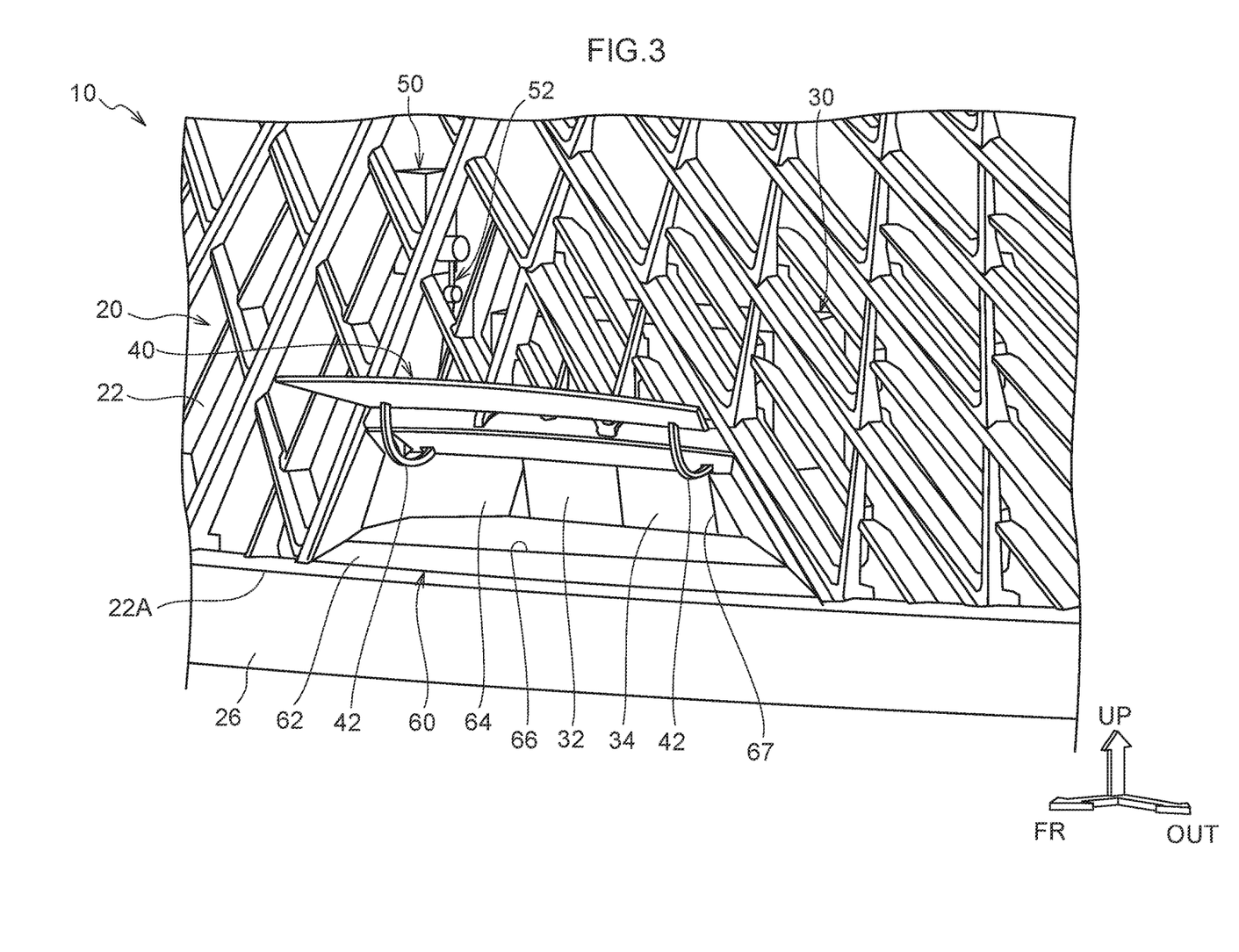
FIG. 3 is a perspective view of the vehicle front portion structure shown in FIG. 1, showing a state in which a cover is open.

The spacer portion 64 is disposed at the vehicle rear side of the cover 40 in a closed state thereof (see FIG. 1 and FIG. 3). The spacer portion 64 is formed in a shape that is recessed to the vehicle rear side from the frame portion 62. An aperture 67 is formed at positions of the spacer portion 64 that oppose the cover 40 in the closed state. The aperture 67 exposes a light emission surface 32 and a light reception surface 34 of the radar 30 to the front side of the vehicle (see FIG. 3 and FIG. 5). The light emission surface 32 and light reception surface 34 are described below.

Figure 4:
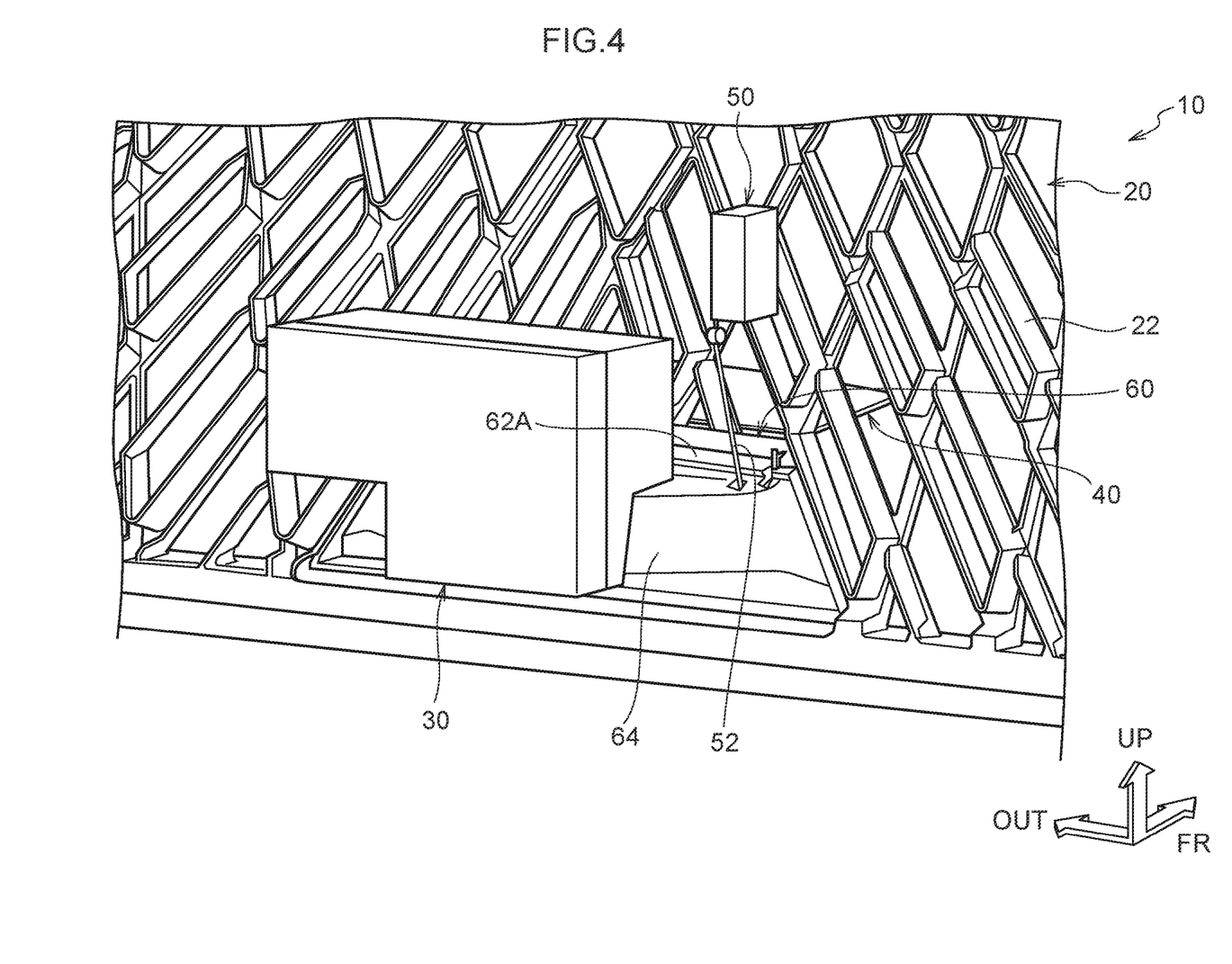
FIG. 4 is a perspective view showing the vehicle front portion structure shown in FIG. 3 from the vehicle rear side.

As shown in FIG. 2 and FIG. 4, the radar 30 is disposed at the vehicle rear side of the spacer portion 64. The radar 30 is a device that, in a state in which autonomous driving is being executed, measures vehicle-to-vehicle distances between the vehicle and other vehicles at the front side of the vehicle, and suchlike, and acquires information on the surroundings of the vehicle. To be specific, as shown in FIG. 3, the radar 30 includes the light emission surface 32, which is an example of an emission surface, and a light reception surface 34, which is an example of an incidence surface.

As shown in FIG. 5, the light emission surface 32 has the function of emitting a light beam LB of infrared light or the like (an example of electromagnetic waves) to the front side of the vehicle. The light reception surface 34 has the function of reflected waves being incident thereon, which reflected waves are produced by the light beam LB emitted to the front of the vehicle from the light emission surface 32 being reflected by an obstacle such as another vehicle at the front side of the vehicle or the like. The light emission surface 32 and light reception surface 34 of the radar 30 are exposed to the front side of the vehicle through the aperture 67 of the spacer portion 64.

As shown in FIG. 1, the cover 40 is formed in a trapezoid shape in front view. The cover 40 is provided at an upper edge portion 62A of the frame portion 62 to be capable of opening and closing. To be specific, an upper portion of the cover 40 is operably and closeably supported at the upper edge portion 62A of the frame portion 62 by support arms 42 at each of one end portion and another end portion of the upper edge portion 62A in the vehicle width direction. The cover 40 is a flap-type opening and closing portion that is opened and closed by being turned about the upper edge portion 62A that runs along the frame portion 62 in the vehicle width direction.

In the closed state (the state shown in FIG. 1 and by two-dot chain lines in FIG. 5), the cover 40 closes off the aperture portion 66. Thus, the cover 40 is disposed at the vehicle front side relative to the light emission surface 32 and light reception surface 34 of the radar 30, and the light beam LB emitted toward the front side of the vehicle from the light emission surface 32 falls on the cover 40. In the closed state of the cover 40, a space between the spacer portion 64 and the cover 40 is an enclosed space.

In contrast, in the open state (the state shown in FIG. 3 and by solid lines in FIG. 5), the cover 40 opens up the aperture portion 66. Thus, the vehicle front side relative to the light emission surface 32 and light reception surface 34 of the radar 30 is opened up, and the light beam LB emitted toward the front side of the vehicle from the light emission surface 32 does not fall on the cover 40 but is directed to the front side of the vehicle. Moreover, reflected waves produced by the light beam LB emitted to the front side of the vehicle from the light emission surface 32 being reflected by another vehicle at the front side of the vehicle do not fall on the cover 40 but are incident on the light reception surface 34.

As shown in FIG. 2 and FIG. 4, the actuator 50 is disposed at the vehicle rear side of the grille portion 22. The actuator 50 includes a rod 52 that is linked to one of the support arms 42. When the actuator 50 pulls up the rod 52, the rod 52 closes the cover 40 via the support arm 42, as shown in FIG. 2. When the actuator 50 pushes down the rod 52, the rod 52 opens the cover 40 via the support arm 42, as shown in FIG. 4.

As shown in FIG. 5, a control unit 70 is connected to the actuator 50. The control unit 70 controls driving of the actuator 50. When the control unit 70 receives start command information commanding the start of autonomous driving, the control unit 70 drives the actuator 50 to open the cover 40. When the control unit 70 receives end command information commanding the end of autonomous driving, the control unit 70 drives the actuator 50 to close the cover 40. Thus, in the vehicle front portion structure 10, the cover 40 is opened when the start of autonomous driving is commanded and the cover 40 is closed when the end of autonomous driving is commanded.

As shown in FIG. 5, a mounting portion 82 of the vehicle front portion structure 10, at which a license plate 80 is mounted, is disposed at the vehicle front side of the grille portion 22, at the upper side of the cover 40.

—Operational Effects of the First Exemplary Embodiment—

Now, operational effects of the vehicle front portion structure 10 according to the first exemplary embodiment are described.

In the vehicle front portion structure 10 according to the first exemplary embodiment, when the start of autonomous driving is commanded, the actuator 50 is driven and the cover 40 is opened, as shown in FIG. 3. Hence, as shown in FIG. 5, the vehicle front side relative to the light emission surface 32 and light reception surface 34 of the radar 30 is opened up, and the light beam LB emitted toward the front side of the vehicle from the light emission surface 32 (see FIG. 5) does not fall on the cover 40 but is directed to the front side of the vehicle. Hence, reflected waves produced by the light beam LB emitted to the front side of the vehicle from the light emission surface 32 being reflected by a other vehicle at the front side of the vehicle are incident on the light reception surface 34. Consequent to the reflected waves being incident on the light reception surface 34, a measurement of vehicle-to-vehicle distance to the another vehicle at the front side of the vehicle and suchlike are implemented, and information on the surroundings of the vehicle is acquired.

When the end of autonomous driving is commanded, the actuator 50 is driven and the cover 40 is closed, as shown FIG. 1. Hence, when the radar 30 is not being used after the end of autonomous driving (for example, during manual driving), because the light emission surface 32 and light reception surface 34 of the radar 30 are covered by the cover 40, the adherence of deposits (for example, water droplets, snow, dust and the like) to the light emission surface 32 and light reception surface 34 may be suppressed.

However, when autonomous driving is being executed, the cover 40 is open and the light emission surface 32 and light reception surface 34 of the radar 30 are exposed as described above. Therefore, the light beam LB emitted from the light emission surface 32 and reflected waves incident on the light reception surface 34 are not attenuated by the cover itself or by deposits adhering to the cover, and a deterioration in detection performance of the radar 30 due to the cover 40 may be suppressed.

It is thought that autonomous driving is used more frequently during high-speed driving on paved roads in good weather. That is, autonomous driving is used less frequently during rain (heavy rain), snowfalls and the like, and during running on poor roads such as dirt roads and the like. Therefore, even though the light emission surface 32 and light reception surface 34 are exposed during the execution of autonomous driving, deposits (for example, water droplets, snow, dust and the like) are unlikely to adhere to the light emission surface 32 and light reception surface 34.

According to the vehicle front portion structure 10 relating to the first exemplary embodiment as described above, both the adherence of deposits to the light emission surface 32 and light reception surface 34 of the radar 30 may be suppressed and a deterioration in detection performance of the radar 30 due to the cover 40 may be suppressed.

In the vehicle front portion structure 10, the cover 40 may be opened to expose the light emission surface 32 and light reception surface 34 of the radar 30. Hence, deposits that have adhered to the light emission surface 32 and light reception surface 34, the inner face side of the cover 40 and the like may be cleaned off.

Second Exemplary Embodiment

Now, a vehicle front portion structure 200 according to a second exemplary embodiment is described. Portions that have the same functions as in the vehicle front portion structure 10 described above are assigned the same reference symbols as appropriate and descriptions thereof are omitted as appropriate.

The vehicle front portion structure 200 is provided with a shutter-type (sliding-type) cover 240 instead of the flap-type cover 40. The vehicle front portion structure 200 differs from the vehicle front portion structure 10 in this respect; other structures are similar to the vehicle front portion structure 10.

Figure 6:
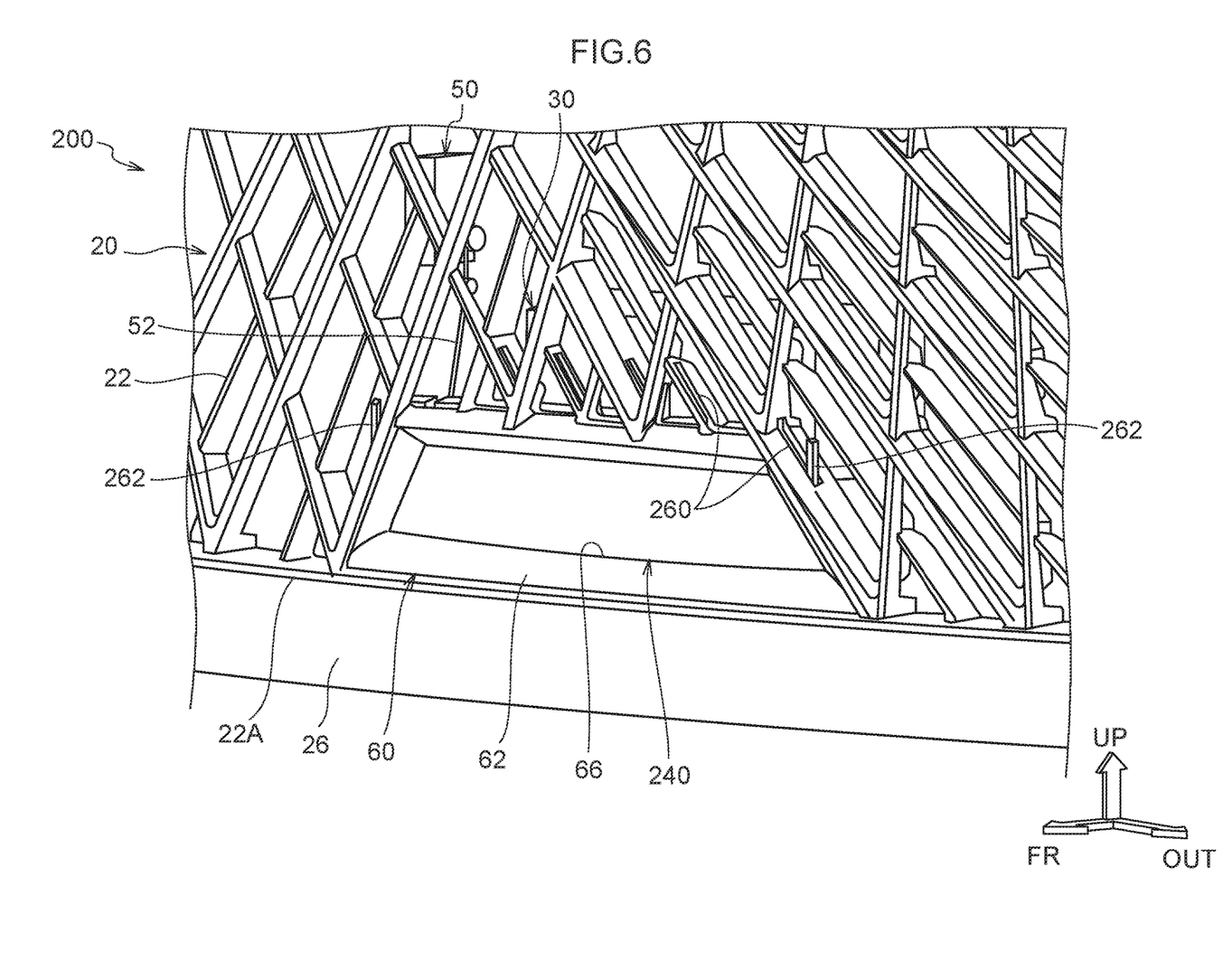
FIG. 6 is a perspective view showing a vehicle front portion structure according to a second exemplary embodiment.

As shown in FIG. 6, the cover 240 is formed in a trapezoid shape in front view. The cover 240 is provided at the frame portion 62 of the bezel portion 60 to be openable and closable in the vertical direction. To be specific, the cover 240 is structured as described below.

A slit 260 is formed penetrating upward through the upper edge portion 62A of the frame portion 62 and reaching the grille portion 22. The slit 260 is capable of accommodating the cover 240. A pair of guide portions 262 are provided at the grille portion 22. The guide portions 262 guide the cover 240 accommodated in the slit 260. The pair of guide portions 262 respectively guide end faces at the two width direction sides of the cover 240.

In a closed state (the state shown in FIG. 6), the cover 240 closes off the aperture portion 66. Thus, the cover 240 is disposed at the vehicle front side relative to the light emission surface 32 and light reception surface 34 of the radar 30, and the light beam emitted toward the front side of the vehicle from the light emission surface 32 falls on the cover 240. In the closed state of the cover 240, a space between the spacer portion 64 and the cover 240 is an enclosed space.

Figure 8:
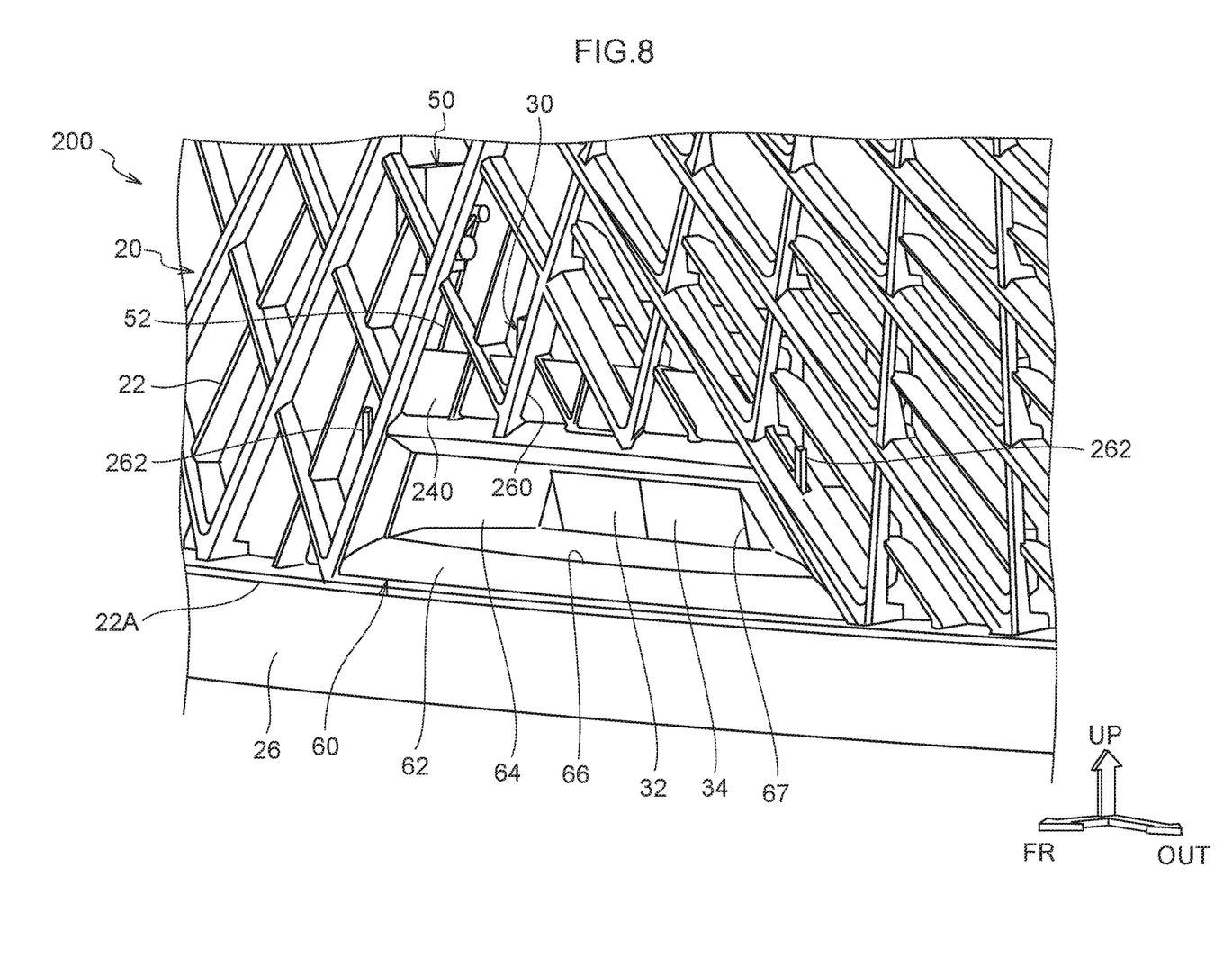
FIG. 8 is a perspective view of the vehicle front portion structure shown in FIG. 6, showing a state in which a cover is open.

In contrast, in an open state (the state shown in FIG. 8), the cover 240 opens up the aperture portion 66. Thus, the vehicle front side relative to the light emission surface 32 and light reception surface 34 of the radar 30 is opened up, and the light beam emitted toward the front side of the vehicle from the light emission surface 32 does not fall on the cover 240 but is directed to the front side of the vehicle. Moreover, reflected waves produced by the light beam emitted to the front side of the vehicle from the light emission surface 32 being reflected by another vehicle at the front side of the vehicle do not fall on the cover 240 but are incident on the light reception surface 34.

Figure 7:
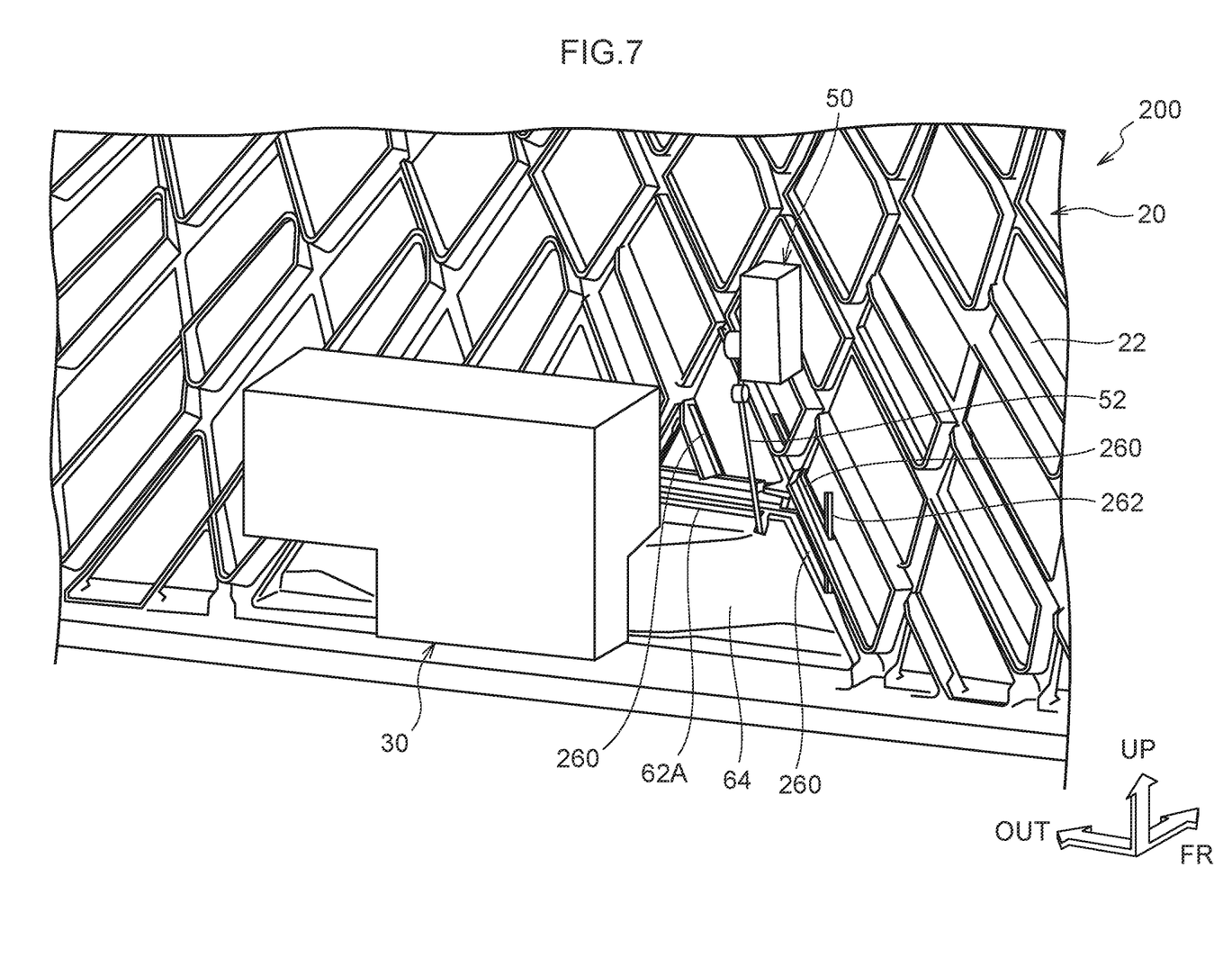
FIG. 7 is a perspective view showing the vehicle front portion structure shown in FIG. 6 from the vehicle rear side.
Figure 9:
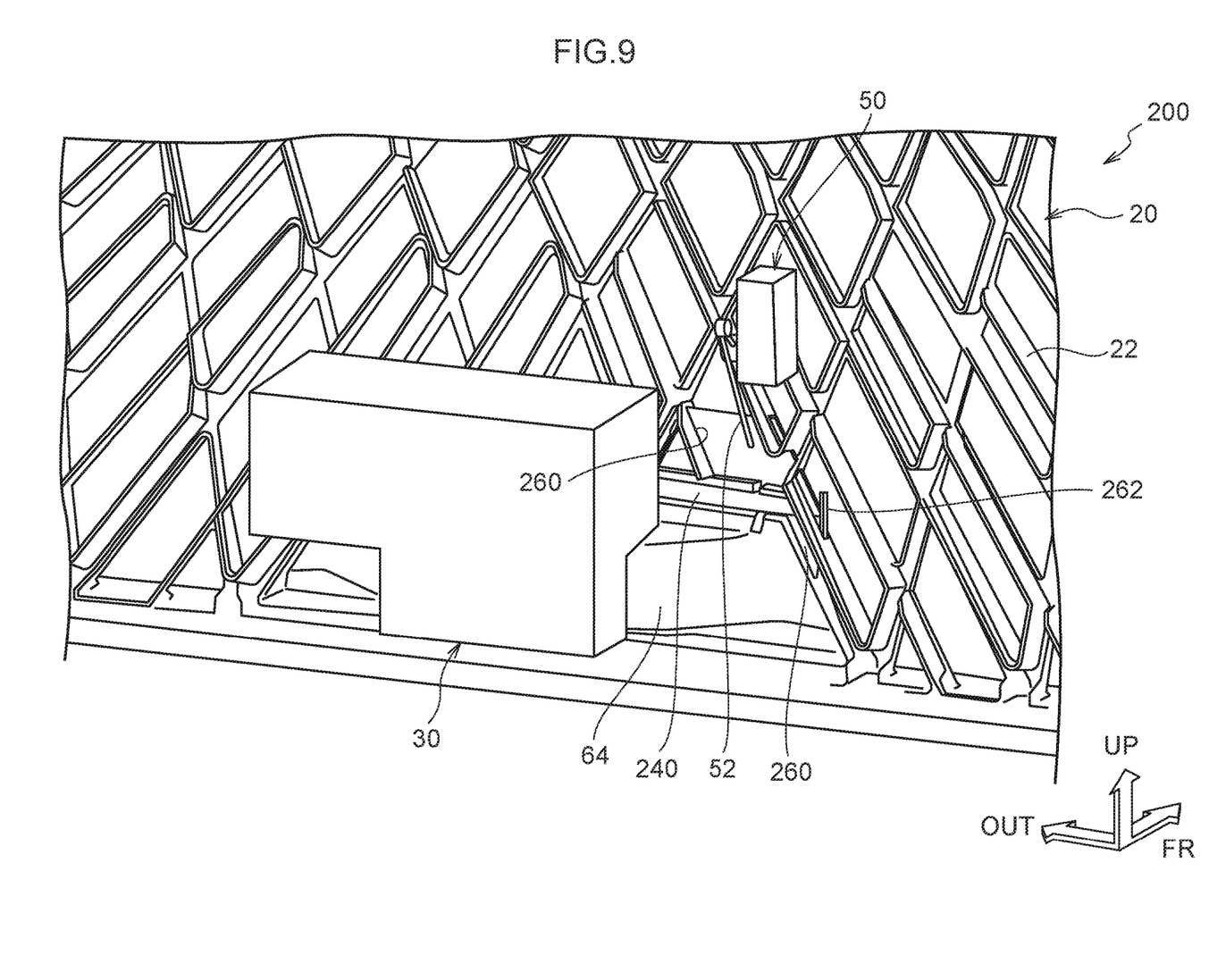
FIG. 9 is a perspective view showing the vehicle front portion structure shown in FIG. 8 from the vehicle rear side.

In the vehicle front portion structure 200, a distal end portion of the rod 52 of the actuator 50 is fixed to the cover 240. When the actuator 50 pushes down the rod 52, the cover 240 closes, as shown in FIG. 7. When the actuator 50 pulls up the rod 52, the cover 240 opens, as shown in FIG. 9. In the vehicle front portion structure 200, the control unit 70 (see FIG. 5) controls driving of the actuator 50. The cover 240 is opened when the start of autonomous driving is commanded, and the cover 240 is closed when the end of autonomous driving is commanded.

—Operational Effects of the Second Exemplary Embodiment—

Now, operational effects of the vehicle front portion structure 200 according to the second exemplary embodiment are described.

In the vehicle front portion structure 200, when the end of autonomous driving is commanded, the actuator 50 is driven and the cover 240 is closed, as shown in FIG. 6. Hence, when the radar 30 is not being used after the end of autonomous driving (for example, during manual driving), because the light emission surface 32 and light reception surface 34 of the radar 30 are covered by the cover 240, adherence of deposits (for example, water droplets, snow, dust and the like) to the light emission surface 32 and light reception surface 34 may be suppressed.

On the other hand, when autonomous driving is being executed, the cover 240 is open and the light emission surface 32 and light reception surface 34 of the radar 30 are exposed as described above. Therefore, the light beam emitted from the light emission surface 32 and reflected waves incident on the light reception surface 34 are not attenuated by the cover itself or by deposits adhering to the cover, and a deterioration in detection performance of the radar 30 due to the cover 240 may be suppressed.

According to the vehicle front portion structure 200 relating to the second exemplary embodiment as described above, both the adherence of deposits to the light emission surface 32 and light reception surface 34 of the radar 30 may be suppressed and a deterioration in detection performance of the radar 30 due to the cover 240 may be suppressed.

The present disclosure is not limited by the exemplary embodiments described above; numerous modifications, alterations and improvements are possible within a technical scope not departing from the gist of the disclosure. In the exemplary embodiments described above, the radar 30 implements detection using a light beam of infrared light or the like. However, a radar may be employed that implements detection using alternative electromagnetic waves such as radio waves or the like.

An object of the present disclosure is to provide a vehicle front portion structure that may both suppress adherence of deposits to an emission surface and incidence surface of a radar and suppress a deterioration in detection performance caused by a cover.

A vehicle front portion structure according to a first aspect includes: a radiator grille; a radar disposed at the radiator grille, the radar including an emission surface from which electromagnetic waves are emitted to the front of the vehicle and an incidence surface at which reflected waves of the electromagnetic waves emitted to the front of the vehicle from the emission surface are incident; and a cover provided at the radiator grille to be openable and closable, the cover covering the emission surface and the incidence surface.

According to the vehicle front portion structure of the first aspect, electromagnetic waves are emitted to the front of the vehicle from the emission surface of the radar disposed at the radiator grille. The electromagnetic waves emitted to the front of the vehicle from the emission surface are reflected by another vehicle or the like in front of the vehicle, and reflected waves are incident on the incidence surface of the radar.

In the vehicle front portion structure of the first aspect, the cover that covers the emission surface and incidence surface of the radar is provided at the radiator grille to be capable of opening and closing. Therefore, when the radar is not being used, the emission surface and incidence surface of the radar may be covered with the cover. As a result, adherence of deposits to the emission surface and incidence surface of the radar may be suppressed.

On the other hand, when the radar is being used, the cover may be opened and the emission surface and incidence surface of the radar may be exposed. As a result, electromagnetic waves emitted from the emission surface and reflected waves incident on the incidence surface are not attenuated by the cover itself or by deposits adhering to the cover, and a deterioration in detection performance due to the cover may be suppressed.

Thus, according to the vehicle front portion structure of the first aspect, both the adherence of deposits to the emission surface and incidence surface of the radar may be suppressed and a deterioration in detection performance due to the cover may be suppressed.

A vehicle front portion structure according to a second aspect further includes a driving mechanism that opens the cover when a start of autonomous driving is commanded.

According to the vehicle front portion structure of the second aspect, when the start of autonomous driving is commanded, the driving mechanism opens the cover. As a result, electromagnetic waves emitted from the emission surface and reflected waves incident on the incidence surface are not attenuated by the cover itself or by deposits adhering to the cover, and a deterioration in detection performance during autonomous driving due to the cover may be suppressed.

In a vehicle front portion structure according to a third aspect, the driving mechanism closes the cover when an end of autonomous driving is commanded.

According to the vehicle front portion structure of the third aspect, when the end of autonomous driving is commanded, the driving mechanism closes the cover. As a result, when the radar is not being used after the end of autonomous driving, the emission surface and incidence surface of the radar are in a covered state, and adherence of deposits to the emission surface and incidence surface of the radar may be suppressed.

According to the present disclosure, excellent effects are provided in that both the adherence of deposits to an emission surface and incidence surface of a radar may be suppressed and a deterioration in detection performance due to a cover may be suppressed.

What is claimed is:

1. A vehicle front portion structure, comprising:
   a radiator grille that includes an aperture portion;
   a radar disposed at the radiator grille, the radar including:
      an emission surface from which electromagnetic waves are emitted to the front of the vehicle, and
      an incidence surface at which reflected waves of the electromagnetic waves emitted to the front of the vehicle from the emission surface are incident;
   a cover provided at the radiator grille to be openable and closable, the cover covering the emission surface and the incidence surface, the aperture portion is opened and closed by the cover; and
   a driving mechanism that opens the cover when a start of autonomous driving is commanded.

2. The vehicle front portion structure according to claim 1, wherein the driving mechanism closes the cover when an end of autonomous driving is commanded.

3. The vehicle front portion structure according to claim 1, wherein the cover is a flap-type cover or a shutter-type cover.

4. The vehicle front portion structure according to claim 1, wherein a shape of the cover is a trapezoid.

5. A vehicle front portion structure, comprising:
   a radiator grille;
   a radar disposed at the radiator grille, the radar including:
      an emission surface from which electromagnetic waves are emitted to the front of the vehicle, and
      an incidence surface at which reflected waves of the electromagnetic waves emitted to the front of the vehicle from the emission surface are incident;
   a cover provided at the radiator grille to be openable and closable, the cover covering the emission surface and the incidence surface; and
   a driving mechanism that opens the cover when a start of autonomous driving is commanded.

6. The vehicle front portion structure according to claim 5, wherein the driving mechanism closes the cover when an end of autonomous driving is commanded.

7. The vehicle front portion structure according to claim 5, wherein the cover is a flap-type cover or a shutter-type cover.

8. The vehicle front portion structure according to claim 5, wherein a shape of the cover is a trapezoid.

9. A vehicle front portion structure, comprising:
   a radiator grille that includes an aperture portion;
   a radar disposed at the radiator grille, the radar including:
      an emission surface from which electromagnetic waves are emitted to the front of the vehicle, and
      an incidence surface at which reflected waves of the electromagnetic waves emitted to the front of the vehicle from the emission surface are incident; and
   a cover provided at the radiator grille, the cover moveable between an open state and a closed state, in the closed state the cover closes the aperture portion to cover the emission surface and the incidence surface, and in the open state the cover opens the aperture portion to uncover the emission surface and the incidence surface,
   wherein the radiator grille includes a frame portion that encircles the aperture portion, the frame portion includes an upper edge that extends along the frame portion in a vehicle width direction, and the cover is supported at the upper edge portion of the frame portion such that the cover is movable between the open state and the closed state by being turned about the upper edge portion of the frame portion.

10. The vehicle front portion structure according to claim 9, further comprising a driving mechanism that opens the cover when a start of autonomous driving is commanded.

11. The vehicle front portion structure according to claim 10, wherein the driving mechanism closes the cover when an end of autonomous driving is commanded.

12. The vehicle front portion structure according to claim 9, wherein the cover is a flap-type cover or a shutter-type cover.

13. The vehicle front portion structure according to claim 9, wherein a shape of the cover is a trapezoid.

* * * * *

UNITED STATES PATENT AND TRADEMARK OFFICE
CERTIFICATE OF CORRECTION

PATENT NO. : 10,576,922 B2  
APPLICATION NO. : 15/863217  
DATED : March 3, 2020  
INVENTOR(S) : Yohsuke Yasui It is certified that error appears in the above-identified patent and that said Letters Patent is hereby corrected as shown below:

In the Specification

In Column 4, Line 32, delete "a other" and insert --another--, therefor.

In Column 4, Line(s) 41 & 42, after "shown", insert --in--.

Signed and Sealed this  
Fifth Day of May, 2020

Andrei Iancu  
*Director of the United States Patent and Trademark Office*